United States Patent
Kogan et al.

(12) United States Patent (10) Patent No.: US 9,711,830 B2
(45) Date of Patent: Jul. 18, 2017

(54) ELECTROCHEMICALLY RECHARGEABLE METAL-AIR CELL WITH A REPLACEABLE METAL ANODE

(75) Inventors: Iakov Kogan, Etobicoke (CA); Anna Khomenko, Etobicoke (CA)

(73) Assignee: Panisolar Inc., Mississauga, ON ( * ) Notice: Subject to any disclaimer, the term of this patent is extended or adjusted under 35 U.S.C. 154(b) by 1058 days.

(21) Appl. No.: 13/602,443

(22) Filed: Sep. 4, 2012

(65) Prior Publication Data

US 2016/0197388 A1    Jul. 7, 2016

Related U.S. Application Data (60) Provisional application No. 61/530,508, filed on Sep. 2, 2011, provisional application No. 61/530,428, filed
(Continued)

(51) Int. Cl.
| | |
|---|---|
| *H01M 4/13* | (2010.01) |
| *H01M 12/08* | (2006.01) |
| *C25B 1/02* | (2006.01) |
| *C25B 11/04* | (2006.01) |
| *H01M 4/42* | (2006.01) |
| *H01M 4/62* | (2006.01) |
| *H01M 4/66* | (2006.01) |
| *H01M 4/86* | (2006.01) |
| *H01M 4/90* | (2006.01) |

(Continued)

(52) U.S. Cl.
CPC .............. *H01M 12/08* (2013.01); *C25B 1/02* (2013.01); *C25B 11/04* (2013.01); *H01M 4/42* (2013.01); *H01M 4/62* (2013.01); *H01M 4/625* (2013.01); *H01M 4/661* (2013.01); *H01M 4/8668* (2013.01); *H01M 4/8673* (2013.01); *H01M 4/9008* (2013.01); *H01M 10/4242* (2013.01); *H01M 2004/027* (2013.01); *H01M 2004/8689* (2013.01); *Y02E 60/128* (2013.01)

(58) Field of Classification Search
CPC ............ H01M 4/94; H01M 2/08; H01M 4/42; H01M 8/22; H01C 7/112
USPC ............................... 429/409, 246; 252/519.5
See application file for complete search history.

(56) References Cited

U.S. PATENT DOCUMENTS

| | | | | |
|---|---|---|---|---|
| 5,306,579 A | * | 4/1994 | Shepard, Jr. ............ | H01M 4/86 429/405 |
| 5,318,861 A | * | 6/1994 | Harats ................. | B60L 11/1879 429/142 |

(Continued)

FOREIGN PATENT DOCUMENTS

| | | | |
|---|---|---|---|
| AM | WO2010118442 A9 | 10/2010 | |
| IL | EP0690521 B1 | 3/1999 | |

OTHER PUBLICATIONS

Educational Material—Amendment Practice—Responding to an Office Action. Jun. 2003.*

*Primary Examiner* — Nina Bhat (57) ABSTRACT

The three electrode zinc-air cell with replaceable and rechargeable zinc anode has been improved to increase battery performance. The electroactive composition of the replaceable zinc anode includes expanded graphite and a conjugated polymer, and the sizes of zinc particles are in the range 30nm-5000nm. The current collector of the zinc anode includes alloys of lead, bismuth or indium. The replaceable zinc cartridge can be used with a metal-air battery to produce electricity, and a hydrogen-on-demand system to generate hydrogen.

12 Claims, 5 Drawing Sheets

Related U.S. Application Data on Sep. 2, 2011, provisional application No. 61/531,446, filed on Sep. 6, 2011, provisional application No. 61/541,033, filed on Sep. 29, 2011, provisional application No. 61/543,328, filed on Oct. 5, 2011.

(51) Int. Cl.
*H01M 10/42* (2006.01)
*H01M 4/02* (2006.01)

(56) References Cited

U.S. PATENT DOCUMENTS

| | | | |
|---|---|---|---|
| 5,360,680 A * | 11/1994 | Goldman | H01M 4/02 |
| | | | 429/404 |
| 5,418,080 A | 5/1995 | Korall | |
| 5,418,090 A * | 5/1995 | Koksbang | H01M 4/505 |
| | | | 252/182.1 |
| 5,558,947 A | 9/1996 | Robison | |
| 5,569,551 A | 10/1996 | Pedicini | |
| 5,599,637 A | 2/1997 | Pecherer | |
| 5,639,568 A | 6/1997 | Pedicini | |
| 6,060,196 A * | 5/2000 | Gordon | A61M 5/145 |
| | | | 204/283 |
| 6,953,639 B2 | 10/2005 | Kainthla | |
| 2004/0175603 A1* | 9/2004 | Yang | H01M 12/065 |
| | | | 429/406 |
| 2005/0112458 A1* | 5/2005 | Dopp | H01M 2/02 |
| | | | 429/174 |
| 2005/0123815 A1* | 6/2005 | Tsai | H01M 2/367 |
| | | | 429/404 |
| 2008/0096061 A1* | 4/2008 | Burchardt | H01M 4/8652 |
| | | | 429/405 |
| 2012/0021303 A1* | 1/2012 | Amendola | H01M 4/42 |
| | | | 429/406 |
| 2012/0282520 A1* | 11/2012 | Martirosyan | H01M 4/244 |
| | | | 429/206 |
| 2013/0130131 A1* | 5/2013 | Johnson | H01M 12/08 |
| | | | 429/403 |

\* cited by examiner

ELECTROCHEMICALLY RECHARGEABLE METAL-AIR CELL WITH A REPLACEABLE METAL ANODE

This application claims benefit to U.S. provisional application 61/530,508 filed Sep. 2, 2011, and to U.S. provisional application 61/530,428 filed Sep. 2, 2011, and to U.S. provisional application 61/531,446 filed Sep. 6, 2011, and to U.S. provisional application 61/541,033 filed Sep. 29, 2011, and to U.S. provisional application 61/543,328 filed Oct. 5, 2011 all of the subject matter has been incorporated by reference.

REFERENCES CITED

| | | | | |
|---|---|---|---|---|
| U.S. Pat. No. 5,306,579 | April/1994 | Shepard et al. | AER Energy Resources, Inc. | 429/405 |
| U.S. Pat. No. 5,418,090 | May/1995 | Korall et al. | Electric Fuel Ltd. | 429/27 |
| U.S. Pat. No. 5,318,861 | June/1994 | Harats and Goldstein | Electric Fuel Ltd. | 429/21 |
| U.S. Pat. No. 20050123815 | June/2005 | Tsai et al. | Reveo Inc. | 429/27 |
| U.S. Pat. No. 20080096061 | April/2008 | Burchhardt | ReVolt Technology Ltd | 429/13 |

BACKGROUND OF THE INVENTION (1) Field of the Invention

The present invention relates to the energy storage systems based on zinc-air batteries with rechargeable/replaceable zinc anodes.

(2) Description of the Prior Art

Metal-air batteries are considered prospective devices for energy storage because of low cost, high energy density and no risk of fire or explosion. However zinc-air batteries have numerous problems: electrolyte drying, materials degradation, air electrode clogging, self-discharge, flooding, metal corrosion, growing resistance and poor rechargeability. Many of the mentioned problems have been addressed in this invention.

Zinc, iron, magnesium, aluminum or their alloys can be used in metal-air batteries with replaceable metal anodes. At present only zinc electrodes and their alloys are suitable for practical implementation as components of electrochemically rechargeable metal-air batteries. Zinc is prospective anode material because of sufficiently high battery voltage and rechargeability. An iron-air battery has too small voltage to be considered viable for use in a metal-air battery.

The word "battery" in this application is equivalent to the word "cell" when the number of elementary cells is not specified.

A zinc-air rechargeable battery with a bifunctional air electrode was proposed by Shepard et al., U.S. Pat. No. 4,842,963. The air electrode included oxygen reduction and oxygen evolution catalysts. This application uses a bifunctional air electrode, which is expensive and difficult to optimize for long term operation.

A battery with a replaceable metal anode was developed by Koral et al. U.S. Pat. No. 5,418,090 who suggested a mechanically rechargeable zinc-air battery. The cell could be recharged quickly, however the zinc anode required a complex procedure of recovery.

A battery with dual air electrodes was proposed by Harats and Goldstein U.S. Pat. No. 5,318,861 and Tsai et al. U.S. Pat. No 20050123815. A three electrode battery included an air reduction and oxygen evolution electrodes. The oxygen evolution electrode was positioned inside the cell.

The most attractive property of a zinc-air cell is low cost, however the complexity of the design of the discussed above batteries increases the cost essentially, and makes zinc-air devices less competitive in comparison with lithium batteries.

Burchardt U.S. Pat. No 20080096061 proposed to include metal hydrates as the components of the air electrodes to eliminate zinc-air cell drying.

Yager U.S. Pat. No 20120082907 suggested that anode metal could be deposited on the metal core (for example wire) to form a bundle preferably in form of coil. The presence of an adhesive or a binder as a component of a metal anode results in the increased resistance of the metal anode. A metal anode in form of coil is difficult to arrange in a flat battery to form a storage device with high energy density. The use of current collectors, which are expensive, or catalyze hydrogen evolution, or form insulating oxide layer, or form hydride layer is ineffective from the point of view of price or stability.

Objectives of the Invention

The principal objective of this invention is to propose a low cost, electrochemically rechargeable and replaceable zinc anode for zinc-air batteries.

A further objective of the invention is to improve and simplify the zinc-air cell by elimination of the non-functional construction elements.

A further objective of the invention is to provide a new electroactive composition of the replaceable zinc anode, which is rechargeable, stable in operation, suitable for fast and low cost production.

A further objective of the invention is to provide a non-toxic additive to the electroactive composition of the metal anode to further eliminate hydrogen evolution in the rechargeable zinc-air cell A further objective of the invention is to eliminate the growth of electrical resistance of the metal anode by changing the composition of its current collector.

A further objective of the invention is to eliminate drying of a rechargeable metal-air battery.

A further objective of the invention is to use a metal anode as a universal energy storage module that can produce electricity in the zinc-air cells or hydrogen in the rechargeable hydrogen generators.

A further objective of the invention is to propose a rechargeable hydrogen generator with the replaceable and rechargeable zinc anode of this invention.

SUMMARY OF THE INVENTION

A three electrode zinc-air cell with mechanically replaceable and electrochemically rechargeable zinc anode was proposed. The functions of oxygen reduction and oxygen evolution are split between two air electrodes that form the cell walls. The zinc-air cell includes an additional air tight ion conduction membrane at the interface between the oxygen evolution air electrode and the electrolyte that prevents the penetration of oxygen inside the metal-air cell. The metal air cell further includes two layers of the hydroxide hydrate composition to decrease drying.

A replaceable metal anode includes a zinc composition, a current collector that has the shape of a spiral spring, and a porous jacket with ion selective properties. The metal anode composition includes expanded graphite. The anode uses a low cost small particle size metal dust to realize maximum possible power, and a conjugated polymer to inhibit hydrogen evolution. The current collector to the metal anode is made of zinc, lead, bismuth and indium alloys.

This application proposes a replaceable zinc anode as a universal energy storage unit to produce electricity as an anode of a zinc-air battery or hydrogen as the anode of a hydrogen-on-demand generator.

A hydrogen-on-demand generator suitable for using a replaceable metal anode of this invention includes a cathode, an oxygen evolution electrode, and an electrolyte. The cathode is covered by a hydrogen evolution catalyst, while the oxygen evolution electrode with an oxygen evolution catalyst. When the zinc anode is connected to the cathode through a variable resistor the hydrogen is produced on the cathode while the zinc anode is oxidized. The variable resistor controls the rate of hydrogen production. Zinc electrode can be electrochemically recovered by applying DC voltage to the oxidized zinc anode and oxygen evolution electrodes.

DETAILED DESCRIPTION OF THE INVENTION

This invention proposes the electrochemically rechargeable zinc-air cell with dual air electrodes, and a replaceable zinc anode. The charge and discharge functions are split between the air electrode optimized for oxygen evolution, and the air electrode for oxygen reduction. The discharge of the cell takes place by connection a load to the air electrode and the zinc anode. Oxygen evolution air electrode is disconnected during discharging. The charge of the cell takes place by connection of a DC or pulse power supply to the oxygen evolution electrode and the zinc anode. The oxygen reduction air electrode is disconnected during charging.

Some of technical solutions, excluding recharging, can be applied to iron, magnesium, silicon and aluminum electrodes or their alloys. The list of alloys includes $MgZn_2$, $Mg_2Zn_3$, $Mg_2Zn_{11}$, $MgZn$, $Mg_{48}Zn_{52}$, or $Mg_2Zn_{11}$ The expression "replaceable zinc anode" can be used interchangeably for zinc cartridge, zinc module, zinc cassette of other inventions when the inventions are related to zinc-air batteries.

Figure 1:
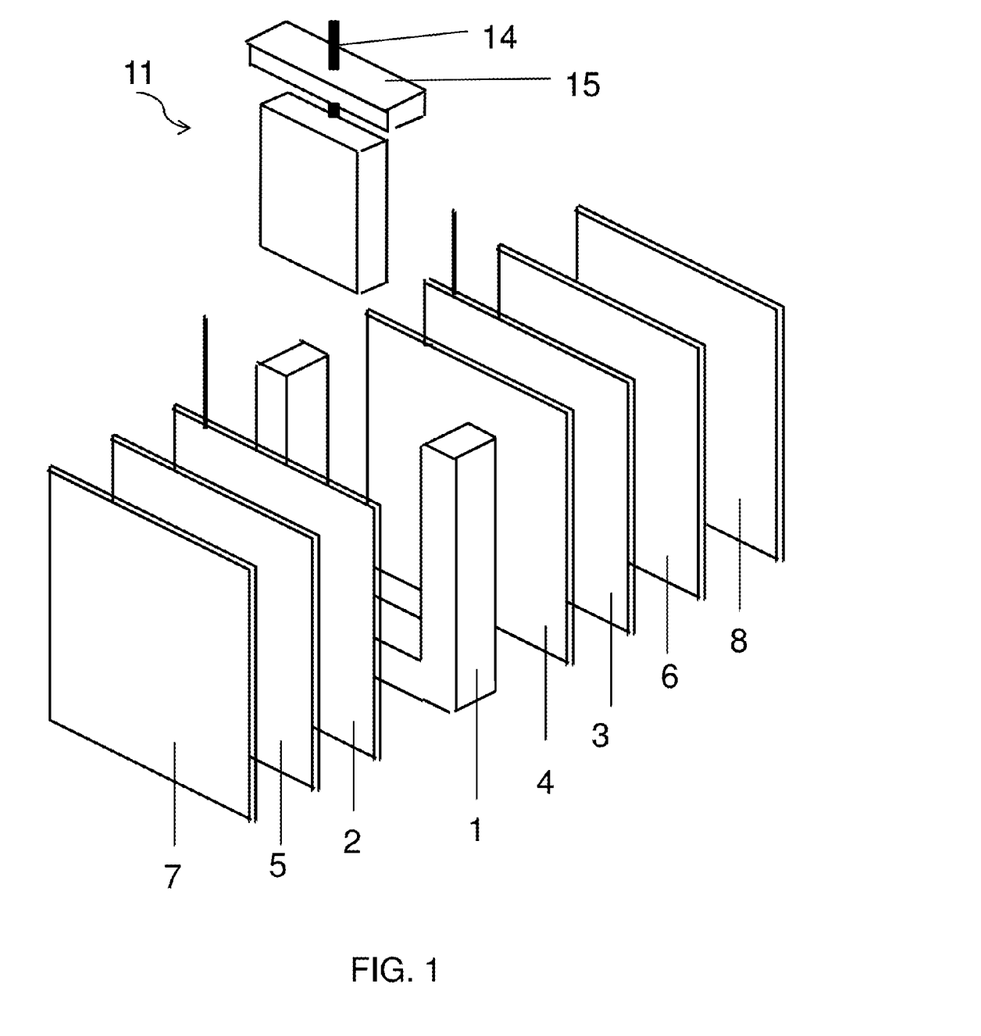
FIG. 1 shows exploded view of the electrochemically rechargeable zinc-air cell with a replaceable zinc anode.

The expanded view of the zinc-air cell of this invention is presented in FIG. 1. The important feature of the cell construction is the added functionality to its basic construction elements. Prismatic frame 1 is a single passive element of the cell that forms the base for assembling other components. The air electrode 2 and the oxygen evolution electrode 3 form the walls of the cell. The oxygen evolution electrode 3 is separated from the electrolyte by a gas tight membrane 4 with high ionic conductivity that prevents the penetration of oxygen inside the cell. Both the air electrodes 2 and 3 are separated from air with waterproof breathable microporous layers 5 and 6 to prevent electrolyte leakage. In addition, two optional hydrophobic gas diffusion layers 7 and 8 can be used to eliminate electrolyte leakage, and to increase the mechanical strength of the cell. Current collectors 9, 10 are attached to the air electrodes 2, 3 by soldering, welding or any other technique.

The upper part of the prismatic frame 1, FIG. 1 is open to accommodate a replaceable zinc anode 11. The replaceable zinc anode 11, FIG. 2 includes an electroactive zinc composition 12, ion selective jacket 13, and current collector 14 in form of spiral ribbon or spiral wire spring and a rubber cap 15.

Figure 2:
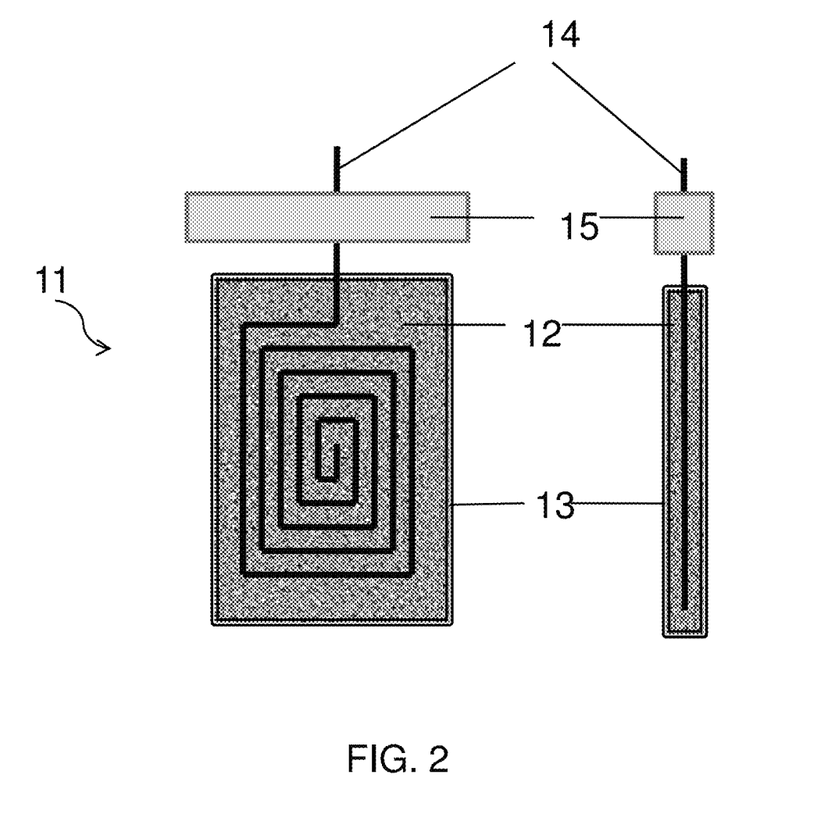
FIG. 2 shows a replaceable zinc anode

The replaceable zinc anode 11 is produced by filling the spiral spring 14 with electroactive zinc composition to form a zinc anode. Then the anode is rapped with an ion selective film, followed by sealing the upper and lower openings by ultrasonic welding or an adhesive to form a jacket around said spiral spring frame filled with the electroactive zinc composition.

Porous membrane jacket 13 in FIG. 2 provides an ion conducting layer that prevents zinc ions from penetrating the electrolyte, keeps the zinc anode composition compacted with light pressure of the spiral spring current collector. The jacket 13 forms the outer walls of the replaceable cartridge. The membrane jacket can have several layers, and can comprise of porous plastic, rubber, ceramic or metal stable in alkaline electrolytes. The jacket 13 can be formed of two or more layers of different materials, for example metal mesh and a plastic membrane.

The zinc anode 11 is imbedded into the electrolyte that fills the zinc-air cell. An electrolyte is based on 1M-8M solution of KOH, NaOH, LiOH or mixture thereof. The list of optional additives include $Ba(OH)_2*8H_2O$, $Sr(OH)_2*8H_2O$, carbopol, carboxymetilcellulose, sodium or potassium silicate, titanium dioxide with particle sizes in the range 5 nm-100 nm.

The air electrode includes a catalyst, a binder, carbon black and graphite. The catalyst is mixed with the binder, for example polytetrafluorethylene dispersion, or with graphite. Then graphite powder, carbon black, and/or conjugated polymer powder are mixed with said binder dispersion to form a paste. The paste is deposited on the surface of the metal mesh or the metal foam to form the air and oxygen evolution electrodes 2 or 3. Then the waterproof layers 5 or 6 are applied to the outer sides of the air and oxygen evolution electrodes 2 or 3 while the gas tight membrane 4 to the inner side of any air electrode followed by calendering. The application of the gas tight membrane to the air electrode is optional and is not shown in FIG. 1. Then the electrodes are baked at the predetermined temperatures to remove the solvent and the surfactant. After cooling the electrodes are optionally calendered again.

The catalysts for oxygen reduction air electrode is selected from manganese dioxide, cobalt oxide, lanthanum strontium manganite, lanthanum strontium cobalt ferrite, platinum phthalocyanine, cobalt phthalocyanine, manganese phthalocyanine, a complex of the manganese salt and polyaniline or mixture thereof. The catalyst is selected in form of microparticles or nanoparticles.

Catalysts for oxygen evolution electrode are selected from lanthanum strontium cobalt ferrite, lanthanum strontium manganite, iridium dioxide, ruthenium dioxide, silver, wolfram carbide and other materials.

Materials of the current collectors of the air electrodes include nickel, nickel alloys, stainless steel, carbon or graphite in the form of mesh, foam, expanded or perforated sheet. Carbon based materials can be covered by plating, electroless metal deposition, decomposition of a metalloorganic compound to form a metal layer that improves the conductivity of a carbon sheet and its stability to corrosion in alkaline electrolytes.

Figure 3:
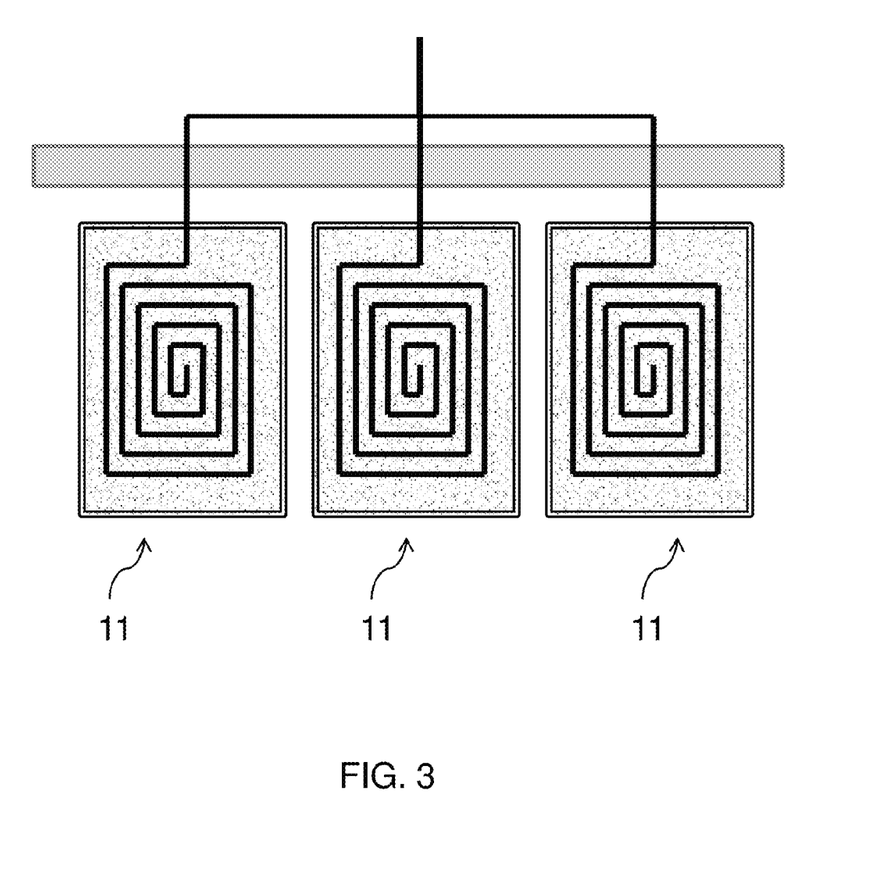
FIG. 3 shows a replaceable zinc anode, which is a set of the elementary zinc anodes

An optional layer of a hydroxide hydrate composition 16 can be placed between the gas tight layer 4, and the catalyst layer 3, FIG. 3. The cell components in FIG. 3 are identical to the cell components in FIG. 1 with two hydroxide hydrate layers added. A hydroxide hydrate composition layer 17 can be placed between the air electrode 2 and the waterproof layer 5. This position of the hydroxide hydrate layer is optional also for oxygen evolution electrode 3. A paste that includes $Ba(OH)_2 \times 8H_2O$, $Sr(OH)_2 \times 8H_2O$ or $(MgCO_3) \times Mg(OH)_2 \times 5H_2O$, carbon black powder, graphite powder and a binder is deposited on the surface of the air electrode followed by calendering and baking at predetermined temperature.

The metal anode composition 12, FIG. 2, can be prepared by mixing zinc dust with particle sizes in the interval 900 nm-9000 nm, or metal nanoparticles (30 nm-900 nm) with vermicular graphite, expanded graphite, or carbon black, metal oxides with the alkaline electrolyte. A surface active compound can be added in amount up to 1%.

Said metal anode composition can further include a conjugated polymer selected from polyaniline derivatives, polypyrrole derivatives, polyparaphenylene or its derivative, PEDOT salt, polyphenylenevinylene or its derivative or aniline black.

Said metal anode composition can include polymers of aniline substitute, polymer of aniline complex, polymer of 4-aminodiphenylamine, polyaniline derivative, polyaniline complex, polyaniline salt, or mixture thereof.

We understand conjugated polymer as chemical compound made of multiple monomer units, the number of elementary units starts from 2, i.e. meaning polymer includes oligomer molecules. Polymer is not necessary linear and can be in form of branched or crosslinked chains. The same conjugated polymers can be used as components of the oxygen reduction air electrode or oxygen evolution air electrode.

Polymers formed from aniline derivatives include aniline derivative unit, but often have unidentified composition and structure. Many of said polymers of aniline derivative can be produced by adding an oxidant like potassium bichromate, potassium permanganate, potassium persulfate, hydrogen peroxide and many other to aniline derivative solution in water. Many aniline substitutes, aniline complexes and metal salts or oligomers can be polymerized in the same way.

Said conjugated polymers can be added in form of powder, or deposited on the surface of the carbon black, graphite, expanded graphite, ptfe powder from solution of a conjugated polymer or during polymerization, and then added to the other components of the electroactive metal composition. Said conjugated polymer is added in amount >1%. The addition of a conjugated polymer decreases hydrogen evolution and increases the shelf life of the metal composition to a period not less than one month. The zinc anode with a conjugated polymer additive can be used in other batteries with alkaline electrolyte, for example nickel-zinc batteries.

Ribbon spiral springs or wire spiral springs are used as current collectors 14 to the zinc electrode. The current collectors can be formed of lead, bismuth, indium, and gallium-alloys. The examples of alloys include: In-95%, Bi-5%; In-99%; Bi-1%; In-90%, Zn-10%; In-95%, Zn-5%; In-99%, Zn-1%; In-95%, Sb-5%; Zn-97%, Bi-3%; Zn-99%, Bi-1%; Zn-99%, In-1%; Zn-98%, Ga-2%; Pb-95%, Bi-5%; Pb-99%, Bi-1%; Pb-97%, Ga-3%; Pb-99%, Sb-1%; Pb-95%, In-5%; Pb-99%; In-1%; Pb-98%, Bi-2%.

The advantage of a current collector in form of a spiral spring is the simplicity of production that does not require special equipment. Further advantage is the formation of an additional compression force on the electroactive zinc composition after assembling. Additional compression also increases electrical conductivity of the zinc anode.

The spring current collectors made of expanded graphite compositions can have an additional layer of a metal alloy deposited on the surface of the spring by electrochemical or electroless deposition, printing, stamping, CVD, electrophoresis, sputtering and other techniques. The layer can be comprised of alloys of tin, bismuth, lead, indium or silver which increase the conductivity of said current collectors.

Jacket 11 in FIG. 2 has three functions. The first function is to provide an ion conducting layer, the second function is to form case of the electrode assembly, and the third function is to keep electrode assembly in the lightly compressed state. Ion selective membrane may have several layers, and can comprise of plastic, rubber, ceramic or another material. The replaceable zinc anode can be used repeatedly and recovered by electrochemical reduction inside the cell or outside the cell.

The cap 15, FIG. 1 has predetermined shape and fits the opening of the cell. The cap can be formed of rubber, porous rubber or plastic or porous plastic. The rubber or plastic shape can be formed by casting.

Figure 4:
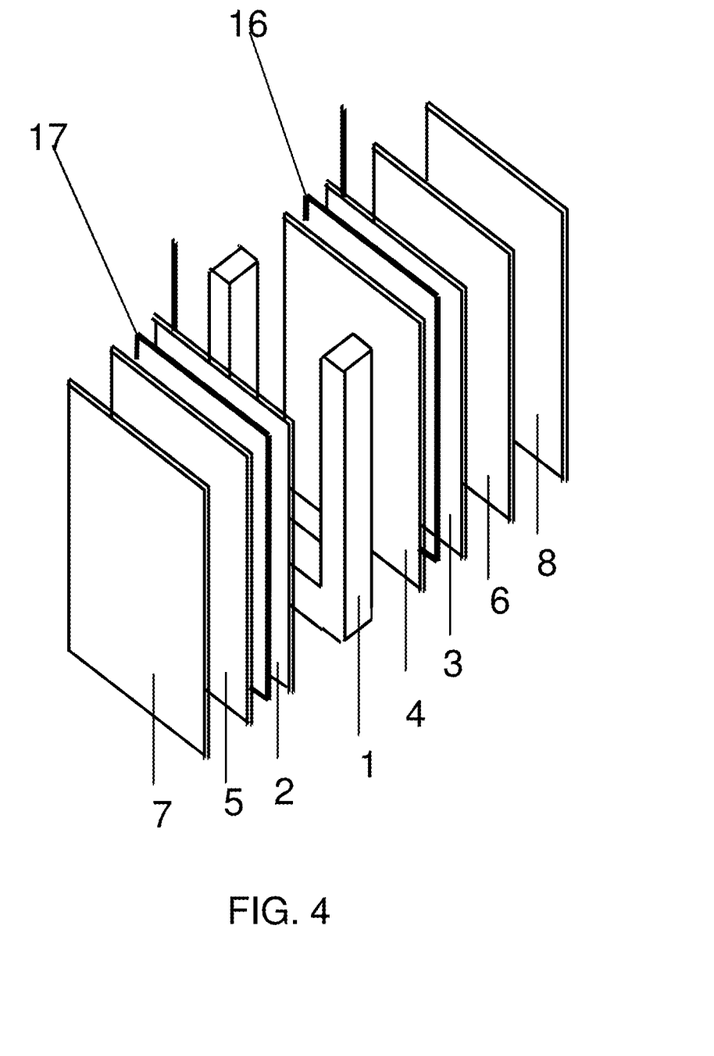
FIG. 4 shows exploded view of the electrochemically rechargeable zinc-air cell and the position of the hydroxide hydrate layers

A current collector of the replaceable zinc anode can be formed of the set of the basic current collectors as demonstrated in FIG. 4. In this case all the basic current collectors are joined to form a common current collector.

The zinc-air batteries with replaceable zinc anodes can have any shape including concave or convex forms.

The replaceable zinc anode of a zinc-air battery has numerous advantages A replaceable zinc anode is safe in operation, does not pose risk of fire or explosion, and does not require heavy containers for transportation. Zinc has high volumetric energy density, and needs limited space for storage; it is safe in operation and can be recharged electrochemically.

The replaceable zinc anode has the capability to generate hydrogen. A hydrogen generator is presented in FIG. 5. The walls of the hydrogen generator are fixed by an adhesive to the base 18 to form a cathode 19 and an auxiliary electrode 20. The hydrogen generator has an opening that can accommodate a replaceable zinc anode 11 and the generator can be filled with the alkaline electrolyte. The replaceable zinc anode of the hydrogen generator has the same composition and design as a replaceable zinc anode of the zinc-air cell.

Figure 5:
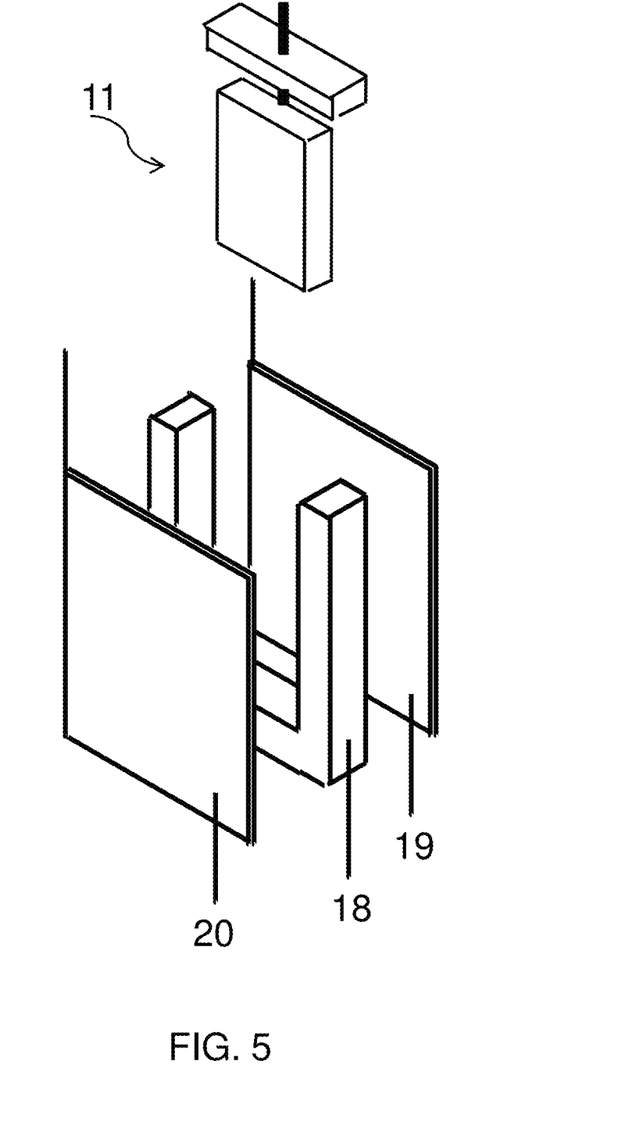
FIG. 5 shows a rechargeable hydrogen generator with a replaceable zinc anode

The cathode 19 includes a catalyst for hydrogen production. Cathode 19 is made of metallic foil, for example stainless steel, nickel, brass etc. Metal can be covered by another layer with high surface area, for example nickel. The replaceable zinc anode is connected to the cathode through a switch and a variable resistor. When switch is "ON", and the zinc anode is connected to the cathode, electrons propagate from the zinc anode to the cathode and initiate hydrogen evolution. Said variable resistor controls the rate of hydrogen production. The rate of hydrogen evolution can be controlled by the application of DC voltage too. When positive potential is applied to the zinc anode the production of hydrogen accelerates.

The hydrogen generator also includes an oxygen evolution electrode 20 that can be used for electrochemical regeneration of the zinc anode. In the process of hydrogen production the oxygen evolution electrode is disconnected. To regenerate the oxidized zinc anode after discharge, the negative voltage of the DC power supply is applied to the zinc anode while positive voltage to the oxygen evolution electrode. The cathode should be disconnected during regeneration.

The oxygen evolution electrode can be made of metal foil or other electrode materials stable in alkaline solutions, and is covered by a catalyst to produce oxygen, for example lanthanum strontium cobalt ferrite, lanthanum strontium manganite, iridium dioxide, ruthenium dioxide, silver, wolfram carbide and other materials.

The invention is not limited to the details of the illustrative embodiments, and the present invention can be embodied in other specific forms without departing from essential attributes thereof, and it is desired that the present embodiments will be considered in all respects as illustrative and not restrictive.

The invention claimed is:

1. An electrochemically rechargeable and replaceable zinc anode comprising:
   a.) an electroactive zinc composition comprising zinc particles, carbon based additives, electroconducting materials, anticorrosion additives, surface active compounds and an electrolyte;
   b.) a current collector attached to said electroactive zinc composition; and
   c.) an ion selective jacket wrapped around said electroactive zinc composition firmly attached to said current collector,
   wherein said current collector is selected from the group consisting of bismuth, indium and lead alloys; and
   wherein the upper and lower openings of said ion-selective jacket are sealed, and said zinc particles are sized in the range of 30 nanometers-5000 nanometers.

2. The electrochemically rechargeable and replaced zinc anode of Claim 1 wherein said ion selective jacket is composed of membrane materials selected from the group consisting of porous rubber, ceramic and plastic.

3. The electrochemically rechargeable and replaceable zinc anode of Claim 1 wherein said carbon based additive of said electroactive zinc composition includes expanded graphite with particles sizes in the range 0.5 microns-150 microns.

4. The electrochemically rechargeable and replaceable zinc anode of Claim 1 wherein said anticorrosion additive of said electroactive zinc composition is selected from the group consisting of polyaniline, aniline polymer, aniline polymer derivative, complex of aniline polymer, 4-aminophenylendiamine polymer, polyaniline derivative, polyaniline complex, polyaniline salt, aniline black and mixtures thereof.

5. The elecirochemically rechargeable and replaceable zinc anode of Claim 1 wherein said anticorrosion additive of said electroactive zinc composition is selected from the group consisting of Al(OH)3, PbO, ln(OH)3, Bi(OH)3, Ga(OH)3 and mixtures thereof.

6. The elecirochemically rechargeable and replaceable zinc anode of Claim 1 wherein said electroconducting material of said electroactive zinc composition is selected from the group consisting of indium, lead, bismuth, and gallium alloys having particles sizes in the range of 50 nanometers to 9000 nanometers.

7. The elecirochemically rechargeable and replaceable zinc anode of Claim 1 wherein said carbon based material of said electroactive zinc composition comprises graphene.

8. The etectrochemicaliy rechargeable and replaceable zinc anode of Claim 1 wherein said electroconducting material of said electroactive zinc composition is selected from the group consisting of carbon black, graphite and expanded graphite covered by a layer of material selected from the group consisting of aniline polymer, substituted aniline polymer, aniline complex, polyaniline, polyaniline derivative, polyaniline complex, polyaniline salt, potythiophene, polythiophene derivatives and polythiophene derivative salts.

9. An electrochemically rechargeable and replace zinc anode of Claim 1 means for the production of hydrogen is disposed within a housing including a cathode, an auxiliary electrode, a base, a plug with a hydrogen outlet, and an alkaline electrolyte wherein said cathode with hydrogen evolution catalyst is operatively connected to said zinc anode via a variable resistor control means; and wherein said auxiliary electrode includes oxygen evolution catalyst means for recharging said zinc anode.

10. An electrochemically rechargeable hydrogen generator comprising a housing accommodating a cathode with hydrogen evolution catalyst, an auxiliary electrode with oxygen evolution catalyst, a rechargeable and replaceable zinc anode, an electrolyte and a cap with hydrogen outlet
   a. ) means for hydrogen production when said replaceable and rechargeable zinc anode is operationally connected via variable resistor to said cathode with hydrogen evolution catalyst, and
   b. ) means for regeneration of said rechargeable and replaceable zinc anode when voltage is applied to said rechargeable and replaceable zinc anode and said auxiliary electrode with oxygen evolution catalyst.

11. An elecirochemically rechargeable alkaline zinc comprising:
   a.) a housing
   b.) disposed within said housing a replaceable and rechargeable zinc anode including a current collector, an electroactive zinc composition firmly attached to said current collector, further including a wrapped ion-selective jacket;
   c.) an oxygen reduction electrode in operative connection with said current collector of said rechargeable and replaceable zinc anode and further including a waterproof layer;
   d.) an oxygen evolution electrode in operative connection with said current collector of said rechargeable and replaceable zinc anode and further including a waterproof layer;
   e.) an alkaline electrolyte;
   wherein the current collector of said rechargeable and replaceable zinc anode is selected from the group consisting of bismuth, indium and lead alloys and wherein the upper and lower openings of said ion-selective jacket are sealed, and the zinc particles of said electroactive zinc composition are sized in the range of 30 nanometers to 5000 nanometers.

12. The electrochemically rechargeable zinc-air cell of Claim 11, wherein said oxygen reduction electrode comprises a catalyst selected from the group consisting of platinum phthalocyanine, cobalt-manganese phthalocyanine, manganese salt of polyaniline and mixtures thereof.

* * * * *

UNITED STATES PATENT AND TRADEMARK OFFICE
CERTIFICATE OF CORRECTION

PATENT NO.         : 9,711,830 B2
APPLICATION NO.    : 13/602443
DATED              : July 18, 2017
INVENTOR(S)        : Iakov Kogan et al.

Page 1 of 1

It is certified that error appears in the above-identified patent and that said Letters Patent is hereby corrected as shown below:

On the Title Page

Item (52) appears as follows: (52) U.S. Cl.
Should read: (52) U.S. Cl. --429/21; 4129/13; 429/27; 429/41; 429/44; 429/59; 4129/405--

In the Specification

Column 5, Lines 24, 25 appear as follows: ...metal oxides with the alkaline electrolyte. A surface active compound can be added in amount up to 1%.
Should be changed to: ...metal oxides with the alkaline electrolyte. --The metal anode composition of this invention excludes binders or adhesives.-- A surface active compound can be added in amount up to 1%.

In the Claims

Claim 11, first line appears as follows: 11. An electrochemically rechargeable alkaline zinc comprising...
Should be changed to: An electrochemically rechargeable alkaline zinc-air cell comprising...

Signed and Sealed this
Twenty-fourth Day of October, 2017

Joseph Matal
*Performing the Functions and Duties of the
Under Secretary of Commerce for Intellectual Property and
Director of the United States Patent and Trademark Office*